(12) United States Patent
Webb-Johnson

(10) Patent No.: US 8,321,540 B2
(45) Date of Patent: Nov. 27, 2012

(54) PUSH UPDATE SYSTEM

(75) Inventor: Mark Crispin Webb-Johnson, Kowloon (CN)

(73) Assignee: Network Box Corporation Limited, Hong Kong (CN)

( * ) Notice: Subject to any disclaimer, the term of this patent is extended or adjusted under 35 U.S.C. 154(b) by 238 days.

(21) Appl. No.: 12/399,557

(22) Filed: Mar. 6, 2009

(65) Prior Publication Data

US 2009/0228577 A1 Sep. 10, 2009

Related U.S. Application Data

(63) Continuation-in-part of application No. PCT/IB2007/002567, filed on Sep. 6, 2007.

(30) Foreign Application Priority Data

Sep. 6, 2006 (AU) ............................ 2006904879

(51) Int. Cl.
*G06F 15/177* (2006.01)
(52) U.S. Cl. ........ 709/221; 709/224; 709/242; 709/248; 717/168; 726/3; 726/34
(58) Field of Classification Search .................. 709/221, 709/242, 248, 224; 717/168
See application file for complete search history.

(56) References Cited

U.S. PATENT DOCUMENTS

| | | | | |
|---|---|---|---|---|
| 4,965,743 A * | 10/1990 | Malin et al. | ...................... | 706/45 |
| 5,924,094 A * | 7/1999 | Sutter | .................... | 1/1 |
| 5,991,771 A * | 11/1999 | Falls et al. | ............... | 1/1 |
| 6,353,616 B1 * | 3/2002 | Elwalid et al. | ................. | 370/443 |
| 7,246,205 B2 * | 7/2007 | Balakrishnan et al. | ........ | 711/138 |
| 7,269,664 B2 * | 9/2007 | Hutsch et al. | .................. | 709/246 |
| 7,287,180 B1 * | 10/2007 | Chen et al. | ....................... | 714/4.3 |
| 7,500,020 B1 * | 3/2009 | Kabra et al. | ................... | 709/248 |
| 7,571,168 B2 * | 8/2009 | Bahar et al. | ............................ | 1/1 |
| 7,596,152 B2 * | 9/2009 | Yarvis et al. | ................... | 370/503 |
| 7,627,658 B2 * | 12/2009 | Levett et al. | ................... | 709/223 |
| 7,739,240 B2 * | 6/2010 | Saito et al. | ..................... | 707/634 |
| 7,831,735 B1 * | 11/2010 | Kabra et al. | ................... | 709/248 |
| 7,853,609 B2 * | 12/2010 | Dehghan et al. | .............. | 707/778 |
| 2003/0204624 A1 | 10/2003 | Kushner | | |
| 2004/0153666 A1 * | 8/2004 | Sobel | .............. | 713/201 |
| 2006/0069912 A1 * | 3/2006 | Zheng et al. | ................... | 713/151 |
| 2006/0212474 A1 * | 9/2006 | McCormack et al. | ..... | 707/103 Z |
| 2007/0157192 A1 * | 7/2007 | Hoefler et al. | ................. | 717/168 |
| 2008/0162324 A1 * | 7/2008 | West | ................ | 705/37 |
| 2009/0228577 A1 * | 9/2009 | Webb-Johnson | ............. | 709/221 |

FOREIGN PATENT DOCUMENTS

| | | |
|---|---|---|
| CN | 1350230 A | 5/2002 |
| EP | 1 553 492 A2 | 7/2005 |

* cited by examiner

*Primary Examiner* — Michael Won
(74) *Attorney, Agent, or Firm* — Robert Iannucci; Seed IP Law Group PLLC

(57) ABSTRACT

A push update system for a security system having a plurality of network nodes connected in a hierarchy to a root node, including: (i) an upstream agent of an upstream node for sending updates for respective downstream nodes; (ii) a schedule agent for scheduling processing by the upstream agent; (iii) a downstream agent of a downstream node for receiving and storing updates; and (iv) an update agent for processing received updates to queue updates for a downstream node. The root node includes the upstream agent and the schedule agent. Leaf nodes include the downstream agent, and intermediate nodes include all four agents. The updates include Internet threat signatures for Internet protection appliances of the leaf nodes.

21 Claims, 6 Drawing Sheets

PUSH UPDATE SYSTEM

BACKGROUND

1. Technical Field

The present disclosure relates to a push update system for a security system.

2. Description of the Related Art

Network perimeter security systems are installed at the edge of local and wide area networks of entities to protect the networks from being compromised by external networks. For instance, a connection to the Internet may be protected by a number of machines including a security server connected directly to the Internet, to protect against a wide variety of Internet threats, such as viruses, worms, trojans, phishing, spyware, SPAM, undesirable content and hacking. Configuration files of the security server include signatures or pattern files that are used as a basis to detect the threats and need to be updated on a regular basis. Given the frequency with which Internet threats change and are created, it is a significant challenge to ensure that the security servers are updated in a regular and timely manner. Security organizations, such as Symantec Corporation, Trend Micro Incorporated and Kaspersky Laboratories, release notifications and data that are used to compile signatures for threats on a frequent basis (hourly or in some cases more frequent), requiring configuration files in large numbers of security servers to be correspondingly updated around the world.

Most security servers maintain or update their signature files by polling master or central servers for updates. This pull based approach means that the security servers will be on average out of date by the time of propagation of the update, from the polled server to the security server, in addition to half the time between polls. The propagation delay may also increase significantly when congestion occurs given thousands of machines located around the world may be polling the same server for an update. Also the master or central server normally relies upon the polling server to advise of a polling server's current configuration or otherwise determine the updates that are required. The master server usually does not maintain any information regarding the configuration of the security servers. This communications requirement involves a further overhead that impacts on the efficiency of the update process. Also this requirement for bidirectional communication between the polling and master servers gives rise to significant difficulties when updates need to be performed at locations where the network connections, particularly the Internet connections, are not stable and are prone to failure.

Accordingly, it is desired to address the above or at least provide a useful alternative.

BRIEF SUMMARY

In accordance with one embodiment, there is provided a push update system for a security system having a plurality of network nodes connected in a hierarchy to a root node, including: an upstream agent of an upstream node for sending updates for respective downstream nodes; a schedule agent for scheduling processing by said upstream agent; a downstream agent of a downstream node for receiving and storing updates; and an update agent for processing received updates to queue updates for a downstream node.

One embodiment provides a push update system for a security system, including: a central server system for receiving threat signatures including an upstream agent for sending updates with said threat signatures for respective downstream nodes, and a schedule agent for scheduling operation of said upstream agent for a downstream node; and downstream nodes including a security appliance for receiving and storing said updates.

DESCRIPTION OF THE SEVERAL VIEWS OF THE DRAWINGS

Preferred embodiments of the present invention are hereinafter described, by way of example only, with reference to the accompanying drawings, wherein.

DETAILED DESCRIPTION

Figure 1:
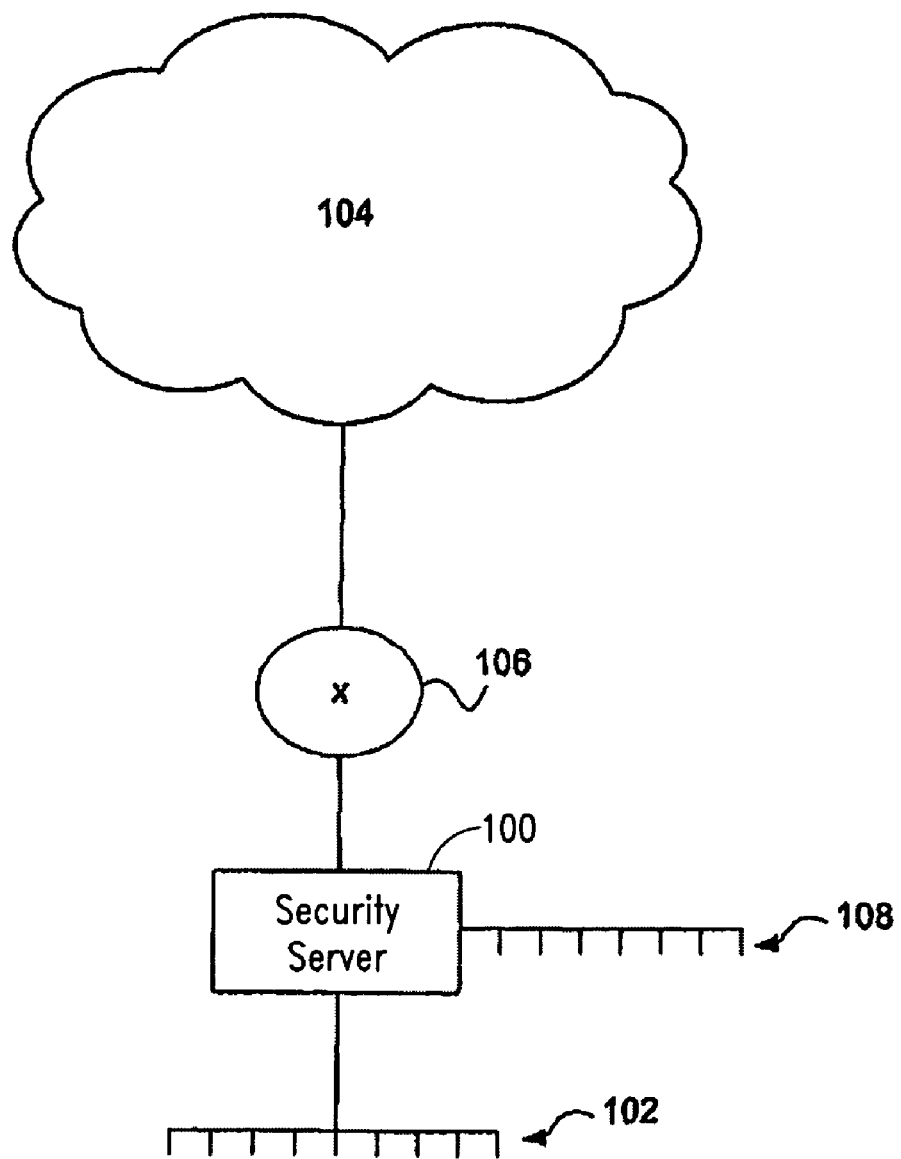
FIG. 1 is a block diagram of a preferred embodiment of a security server connected to a local area network (LAN)

A security server 100, as shown in FIG. 1, provides an Internet threat protection appliance to protect a local area network (LAN) 102 of an entity from a wide variety of Internet threats. The threats includes viruses, worms, trojans, phishing, spyware, SPAM, undesirable content and hacking, and any other form of unwanted code or intrusion into the LAN 102. The security server or box 100 is connected directly to an external communications network 104, such as the Internet, by a router 106, thereby being positioned between the LAN 102 and the Internet 104. The security server or box 100 may also provide support for a demilitarized zone (DMZ) 108 and may include a number of machines. The box 100 can, for example, be one of the threat protection appliances produced by Network Box Corporation. The network architecture in which the security server 100 is used can vary considerably. For example, a number of LANs or a wide area network (WAN) may be protected by one box 100, or the box 100 may support more than one DMZ.

Figure 2:
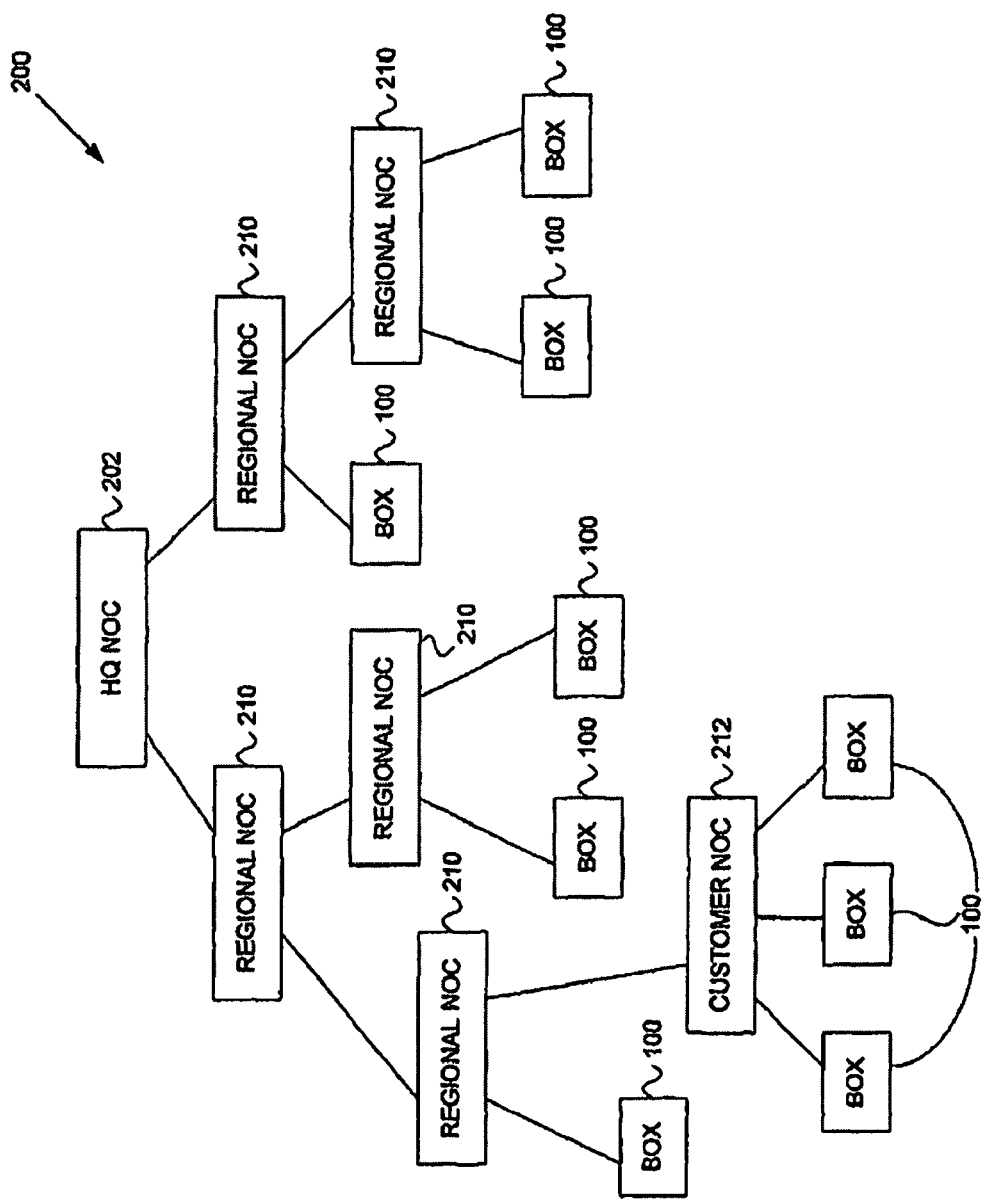
FIG. 2 is a diagram of the architecture of a preferred embodiment of a security system.

A security system 200, as shown in FIG. 2, includes a number of boxes 100 which are all updated by configuration files delivered from a central or headquarters network operations center (NOC) 202. The headquarters NOC 202 provides a root node of the security system 200, and the security boxes 100 are leaf nodes of the security system 200 and are connected in a hierarchy by intervening nodes 210 and 212 of intermediate levels in the hierarchy so that the security system 200 has a tree structure, as shown in FIG. 2. The intervening nodes 210, 212 include regional NOCs 210 allocated to cover a geographic region, such as Australia and New Zealand, and customer NOCs 212 which may be allocated to serve one or more security boxes 100 of an entity. In alternative embodiments, the number of intermediate NOCs 210, 212 may be varied as desired or omitted altogether. The configuration files are delivered from an upstream node (typically, but not always, the root node 202) to downstream nodes (typically the leaf nodes 100) via the intermediate nodes 210 and 212 as updates using a push update system of the security system 200.

The box 100 and the nodes 202, 210 and 212 each include a central processing unit, volatile memory, permanent storage (e.g., flash memory, hard disk) and at least one network interface card for connection to the public and local networks. The box 100 and the nodes 202, 210, 212 can be implemented using general purpose computers. Also, ASIC based systems operating with flash memory can be used. The components 310 to 316 of the update system, discussed below, are implemented using computer program instruction code written in languages such as Perl, C, C++ and Java, and stored on the memory storage of the boxes 100 and nodes 202, 210 and 212. Alternatively, the processes performed by the components 310 to 316 may be implemented at least in part by dedicated hardware circuits, such as ASICs or FPGAs.

Figure 3:
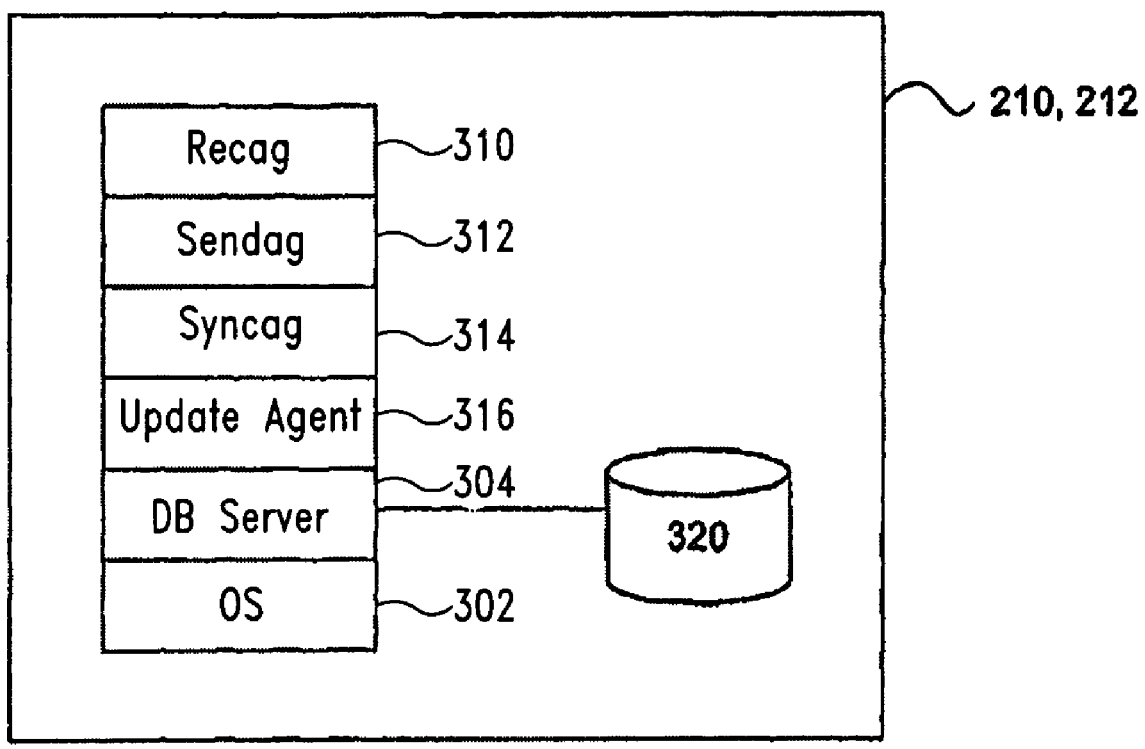
FIG. 3 is a block diagram of a preferred embodiment of a node of the system.

For the push update system, the nodes 210, 212, as shown in FIG. 3, each include a downstream agent, recag, 310, an upstream agent, sendag, 312, a schedule agent, syncag, 314, and an update agent 316 which all run on the operating system 302 of the node 210, 212. The agents 310 to 316 utilize a database 320 maintained in the node 210, 212 by a database server 304, such as MySQL. The root node 202 has the same architecture as the intermediate nodes 210, 212 and runs instances of syncag and sendag, but does not include the downstream agent 310 for a downstream node nor the update agent 316 that is used by an intermediate node 210, 212. The leaf nodes 100, i.e., the boxes 100, only need to include recag 310 as there are no downstream nodes following a leaf node. The box 100 does not run instances of the upstream agent 312, schedule agent 314 or the update agent 316. In other words, the nodes of the hierarchy of the update system all run recag 310 in their capacity as downstream nodes, and sendag 312 and syncag 314 in their capacity as upstream nodes, and the update agent 316 as an intermediate regional or customer node 210, 212.

The updates delivered by the push update system comprise configuration files that belong to one of five categories:

1. Files maintained on a NOC 202, 210, 212 that should be sent, or pushed, to a downstream node. This includes new versions of executable files.
2. Files maintained on a downstream node 210, 212, 100 under management that should be backed up on an upstream node, e.g., a NOC 202, 210, 212, and possibly restored on the downstream node from the upstream node at a later date.
3. Signatures. This includes signatures or pattern files for SPAM and malicious software (malware). The signatures are used to update the signatures held on the databases 320 of the boxes 100, and in most instances are the same for all of the boxes 100. Although the boxes 100 may have different configurations for dealing with Internet threats, the signatures used by the boxes are normally the same. The root node 202 may receive signatures regularly throughout the day, so the boxes 100 may be incrementally updated, as described below.
4. Packages for one time delivery. This includes files that are delivered once to a downstream node and for which there is no subsequent maintenance or monitoring. The packages may include self-extracting files for extraction and installation. Accordingly, no subsequent synchronization is required.
5. Jobs. The jobs include a series of commands to be run on a downstream node and then the results returned to an upstream node.

All of the updates are prepared before a connection is made to a downstream node, so the connection can be fully utilized once established. This is advantageous where Internet connections are unreliable and the elapsed time during which the connection is maintained can be minimized.

Figure 4:
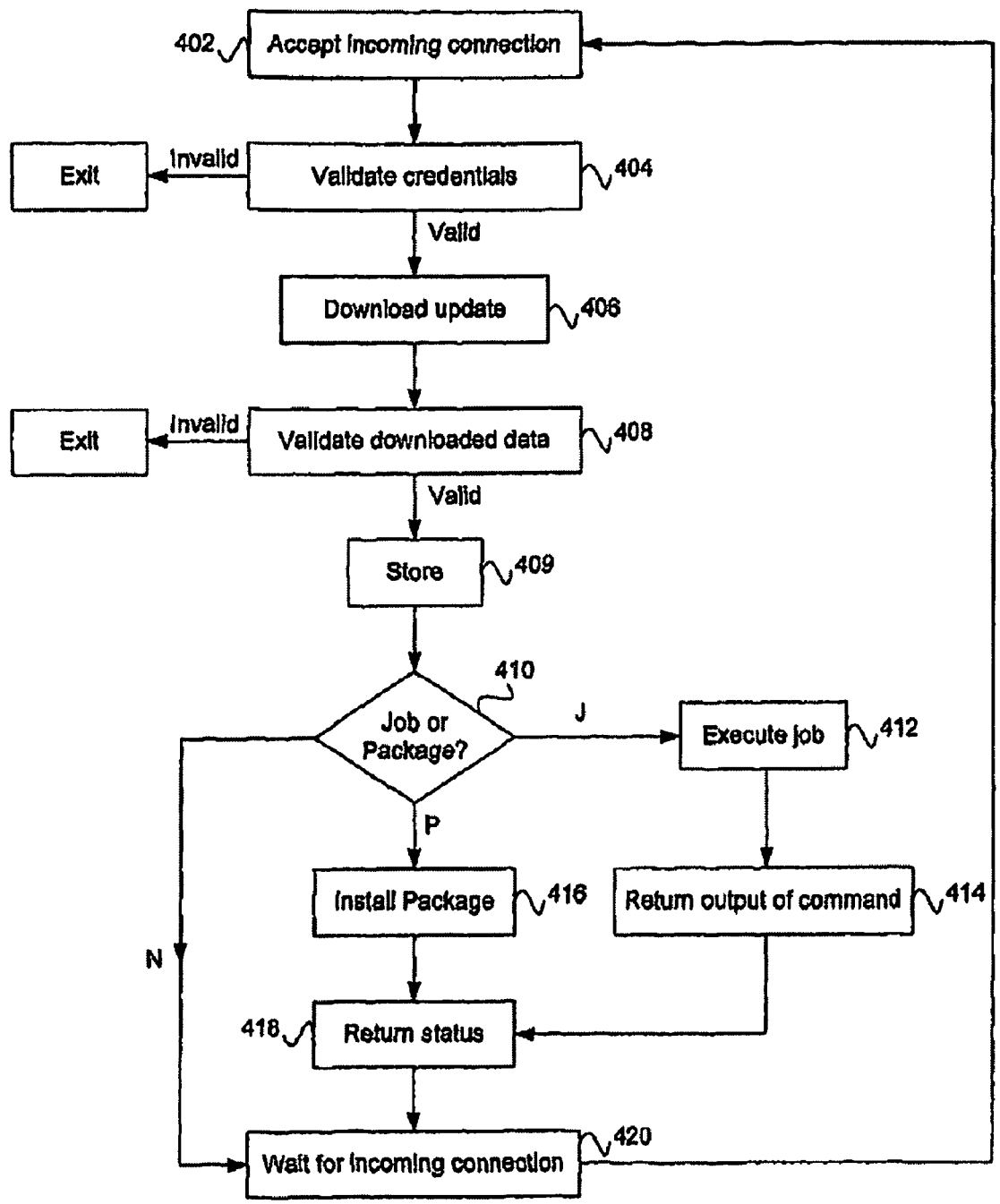
FIG. 4 is a flow diagram of a downstream agent process of a node.

The downstream agent 310, recag, runs on a downstream node 210, 212, 100 and acts as an agent to receive delivered updates and execute commands, by executing a downstream process as shown in FIG. 4. The downstream agent waits for connection requests (step 402) from upstream nodes, and on receiving a request will accept the connection. Connections between the nodes of the security system use available public communications networks and standard Internet protocols with appropriate cryptographic mechanisms. On accepting the connection, the agent seeks to validate identifying data and credentials, such as digital signatures, of the connecting upstream node (404). The process halts if the credentials are invalid, but if validated the agent 310 proceeds to download the update from a connecting upstream node (406). A validation process (408) is performed on the downloaded update to determine it is valid, and if not the process exits. Otherwise, if the data downloaded is valid, the update is stored in a download directory of the database 320 (409). A determination is made at step 410 as to whether the update is a Job. The downstream agent 310 executes the commands of the Job (412) and returns the results of the execution as an output (414) to the connecting upstream node. The agent 310 then proceeds to step 418. If at step 410, the update is determined to be a package, then the package is installed, for example by executing the self-extracted file, (416) by the agent 310. An acknowledgment status is then returned at step 418 to advise that the installation has been completed or that returned results are available. Delivery status of other updates is also reported. The instance of the agent 310 for the connection then completes and the agent 310 waits to spawn another instance for an incoming connection from an upstream node (420). Maintained configuration files and signatures are simply stored on the database 320 once validated (409).

Figure 5:
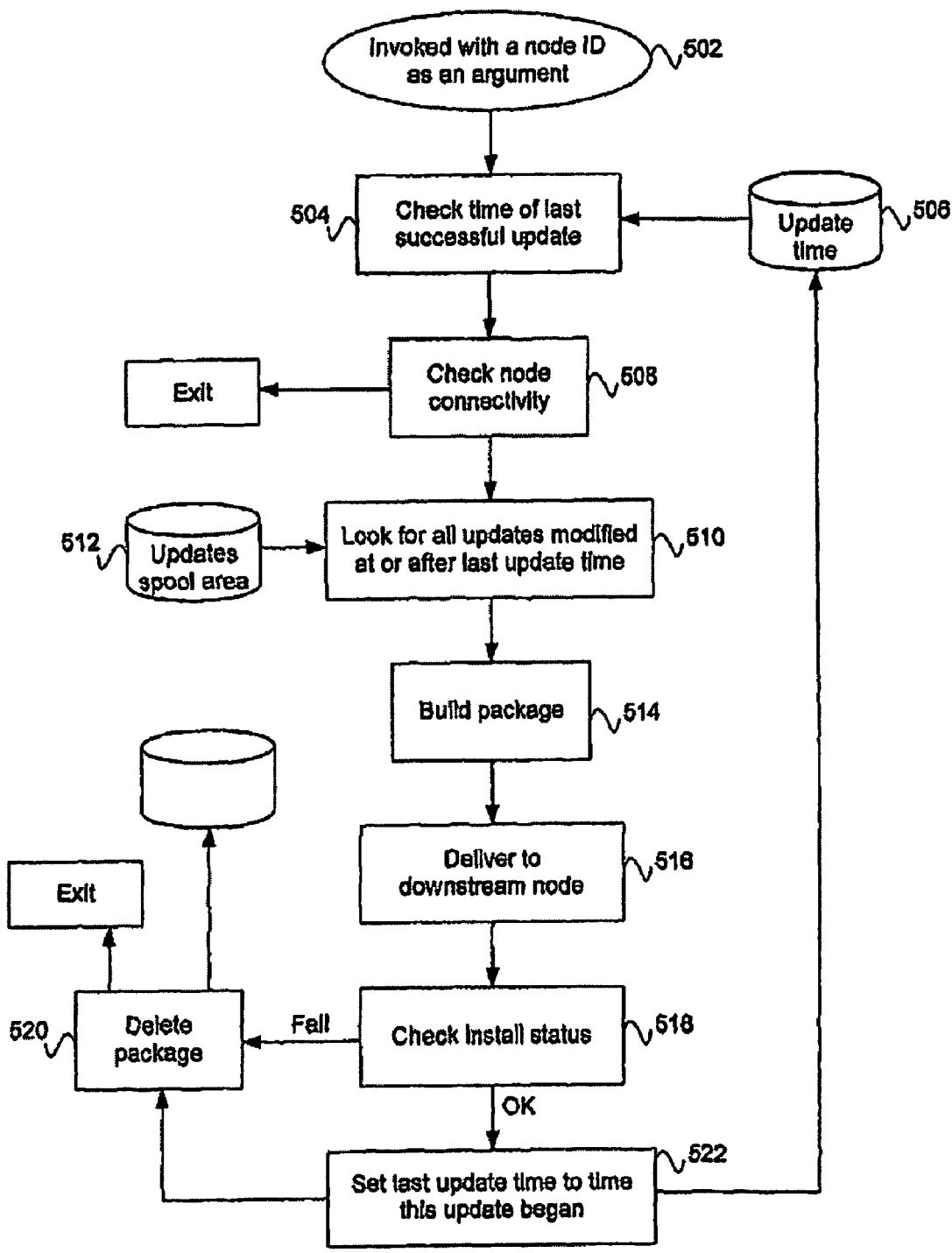
FIG. 5 is an upstream agent process of a node.

The upstream agent, sendag, 312 runs on an upstream node 202, 210, 212 to perform an upstream transmission process, as shown in FIG. 5. The upstream agent 312 connects to recag 310 on a downstream node and sends updates to that node. The upstream agent 312 is invoked with a node identification (ID) data variable as an argument. The node ID identifies a downstream node to which an update package may be delivered. The node ID may be unique to a box 100 or an intermediate node 210, 212, and identifies a node immediately below the current node in the hierarchy running the instance of the upstream agent (step 502). On being invoked, the upstream agent 312 determines whether the last time the node identified by the node ID received a successful update (step 504) based on successful update time data 506 stored in the database 320. The agent 312 then determines (508) whether a connection can be made to the next node in the hierarchy. If a connection can be made to the node, then the downstream agent collects all update data and modified since the last update time (510). The update data can be collected from a variety of sources, including an output spool directory 512 of the database 320 which includes updates received from other nodes. The package is built for delivery (514) so as to form the update and this is delivered to the downstream node (516). The upstream agent then receives the delivery status reported by the downstream node. If the installation is deemed to fail at step 518, then a delete package process (520) is performed so as to delete the package, as the update when another delivery attempt is made may be different. If the installation is deemed to be correct (518) then the update time is stored in the database 320 of the current node running sendag (522) is updated.

Figure 6:
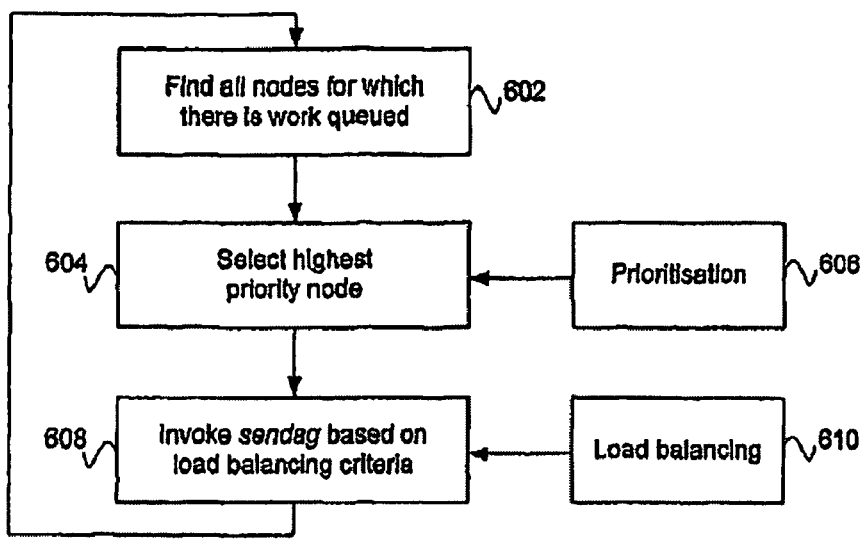
FIG. 6 is a flow diagram of a schedule process of a node.

The schedule agent, nbsync, 314 runs on an upstream node 202, 210, 212 and performs a schedule process, as shown in FIG. 6. The agent 314 monitors the updates queued for downstream nodes and invokes instances of the sendag 312 to process them. The agent 314 accesses the output spool directory 512 of the database 320 to determine all of the downstream nodes for which there are updates queued for delivery (602). At step 604 a determination is made as to the node that has the highest priority for delivery of an update. This determination is based on priority data generated by a prioritization process 606. For example, this may determine updates to be scheduled for delivery to intermediate nodes (i.e., other NOCs) before updates to leaf nodes 100. An instance of sendag 312 is then invoked, for the highest priority node with its node ID, when it is determined to be best to invoke that downstream agent process based on load balancing criteria data. The load balancing criteria data is produced by a load balancing process 610. For example, the process may determine that updates are to be delivered using multiple Internet connections or balance across them. The load balancing process 610 may also operate on data representative of the Internet topology to determine connections that should be established when transmitting to NOCs in a number of countries. If updates are being sent to a number of downstream NOCs, then the delivery process may need to be balanced so that each NOC receives updates in parallel rather than serial. Operation of syncag 314 then returns to step 602.

Figure 7:
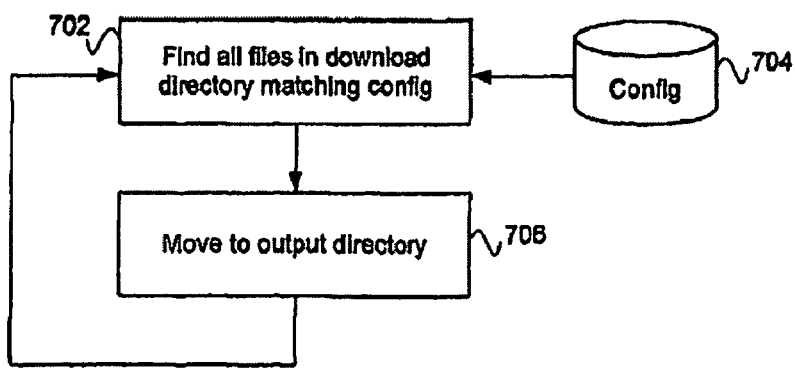
FIG. 7 is flow diagram of an update agent process of a node.

The update agent 316 performs an update watching process, as shown in FIG. 7. The update agent 316 monitors the updates received by recag 310, and based on configuration parameters, such as filename pattern matches, copies particular updates to the output spool directory from the download directory of the database 320 for release by syncag 314 to downstream nodes. The update agent 316 parses all of the files in the download directory (702) for parameters that match configuration parameters 704 stored in the database 320. For any update files that meet the matching criteria, these are then moved to the output directory (706) of the database 320, for subsequent access by sendag 312.

The push update system is bandwidth efficient primarily because only updates that are required are transmitted when a connection is available. Signature updates may be received by the root node 202 on a regular basis, but are only delivered in their entirety at set periods. For example, the root node 202 may receive a number of signature updates through the day, but for delivery the root node bundles the signatures together, and incrementally if no connectivity is available. For example, as shown in the table below, the root node 202 may receive 1,922 signatures (numbered 100000-101921) over a given period, but these are compiled between event resets, as shown in the table below, so that if no connectivity is available during the period covered by the Updates 1 to 5, then when connectivity is established, the system only delivers Updates 4 and 5. The configuration of boxes 100 is controlled in each case by its upstream node, and only updates for a particular box's configuration that are required are delivered. Only the latest version of a file is delivered if multiple updates are queued for a box. For instance, if a box 100 requires an update to a sub-system x, which involves changes to files $X_3$, $x_7$ and $X_{24}$, then only those three files are delivered, instead of updating all components.

| Event | Signatures Included |
|---|---|
| <reset> | |
| Update 1 | 100000-100103 |
| Update 2 | 100000-100497 |

-continued

| Event | Signatures Included |
|---|---|
| Update 3 | 100000-101204 |
| Update 4 | 100000-101694 |
| <reset> | |
| Update 5 | 101695-101921 |

There is no negotiation between the updating upstream node and the downstream node being updated as to the updates that are required. This is determined by the updating upstream node, and again this reduces communications overhead.

In the push update system, the only communications overhead is the time of propagation from an upstream node to a downstream node, and therefore the time that a file is out of date on a downstream node does not depend on any time between polls, as in a pull based polling system. The push based update system is able to operate to determine the updates required when connectivity is not available, and uses connections efficiently when they are available.

A downstream node can also be configured to allow receipt of updates from more than one upstream node. This provides redundancy and also flexibility to configure for different updates to be sent from different upstream nodes.

Many modifications will be apparent to those skilled in the art without departing from the scope of the present disclosure, as herein described with reference to the accompanying drawings.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavor to which this specification relates.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A push update system, including:
a root node of a hierarchy of nodes of a security system, the root node including:
 a first upstream agent configured to send updates to downstream nodes, without a request for said updates from said downstream nodes and without polling of said downstream nodes; and
 a first schedule agent configured to schedule processing by the first upstream agent;
an intermediate node of the hierarchy of nodes, the intermediate node including:
 an update agent configured to process received updates and queue the received updates for transmitting to downstream nodes;
 a second upstream agent configured to send updates to said downstream nodes, without a request for said updates from said downstream nodes and without polling of said nodes;

a second schedule agent configured to scheduling by the second upstream agent; and a first downstream agent configured to receive and store updates from said first upstream agent; and a leaf node of the hierarchy of nodes, the leaf node including:

a second downstream agent configure to receive and store updates; and an Internet protection appliance.

2. A push update system as claimed in claim 1, wherein said second downstream agent is configured to execute commands of an update.

3. A push update system as claimed in claim 1, wherein said second downstream agent is configured to download updates, store data of each update, and determine whether installation of a package or commands are to be executed.

4. A push update system as claimed in claim 3, wherein said second downstream agent is configured to validate credentials of a connecting upstream node.

5. A push update system as claimed in claim 1, wherein said updates include at least one of the following:
  (i) files maintained on an upstream node;
  (ii) files maintained on a downstream node that are backed up on an upstream node;
  (iii) signatures;
  (iv) packages for one time delivery and installation, such as self-extracting files; and
  (v) commands to be run on a downstream node of the hierarchy.

6. A push update system as claimed in claim 1, wherein each upstream agent is configured to be invoked with node identification data representing a downstream node, and is configured to determine a last update time the node identified by the node ID data received an update, collect updates since the last update time, check connectivity to the node and build an update package with the updates for delivery to the downstream node.

7. A push update system as claimed in claim 6, wherein each upstream agent is configured to delete the update package when the delivery is unsuccessful, and set the last update time.

8. A push update system as claimed in claim 1, wherein each schedule agent is configured to process updates queued for downstream nodes and, based on node selection criteria data, invoke the corresponding upstream agent with corresponding node identification data.

9. A push update system as claimed in claim 8, wherein said node selection criteria data includes priority data and/or load balancing criteria data.

10. A push update system as claimed in claim 1, wherein each update agent is configured to process the received updates stored in a download directory for parameters to determine updates to be sent to a downstream node, and move the updates for said downstream node to an output directory for processing by the corresponding schedule agent.

11. A push update system as claimed in claim 1, wherein signatures received by the root node are added to an update for a downstream node based on configuration data for the downstream node.

12. A push update system for a security system, including:
  a central server system configured to receive threat signatures and including:
    a central upstream agent configured to send updates with said threat signatures to respective downstream nodes, without a request for said updates from said downstream nodes and without polling said downstream nodes; and a schedule agent figured to schedule operation of said upstream agent for a downstream node;

downstream nodes including:
  at least one intermediate node including an intermediate upstream agent, an intermediate push schedule agent, an intermediate downstream agent configured to receive and store updates, and an intermediate update agent configured to process received updates and queue updates for a downstream node; and
  leaf nodes each including a leaf downstream agent and a security appliance for receiving and storing said updates.

13. A push update system as claimed in claim 12, wherein each leaf downstream agent is configured to validate credentials of a connecting upstream node, download updates for a corresponding one of the leaf nodes, stores data of the update, and determine whether installation of a package or commands are to be executed.

14. A push update system as claimed in claim 12, wherein said intermediate update agent is configured to process the received updates stored in a download directory for parameters to determine updates to be sent to a downstream node, and move the updates for said downstream node to an output directory for processing by the intermediate schedule agent.

15. A push update system as claimed in claim 12, wherein said central upstream agent is configured to be invoked with node identification data representing a downstream node, and is configured to determine a last update time the node identified by the node ID data received an update, collect updates since the last update time, check connectivity to the node and build an update package with the updates for delivery to the downstream node.

16. A push update system as claimed in claim 15, wherein said central upstream agent is configured to delete the update package when the delivery is unsuccessful, and set the last update time.

17. A push update system as claimed in claim 12, wherein said central push schedule agent is configured to process updates queued for downstream nodes and based on priority data and/or load balancing criteria data, and invoke an upstream agent for one of the downstream nodes with corresponding node identification data.

18. A push update system as claimed in claim 17, wherein said node selection criteria data includes priority data and/or load balancing criteria data.

19. A push update system as claimed in claim 12, wherein said downstream agent is configured to execute commands of an update.

20. A push update system as claimed in claim 12, wherein said updates include at least one of the following:
  (i) files maintained on an upstream node;
  (ii) files maintained on a downstream node that are backed up on an upstream node;
  (iii) signatures;
  (iv) packages for one time delivery and installation, such as self-extracting files; and
  (v) commands to be run on a downstream node of the hierarchy.

21. A push update system as claimed in 12, wherein the central server system is configured to add said signatures to an update for a downstream node based on configuration data for the downstream node.

* * * * *